(12) United States Patent
Shen et al.

(10) Patent No.: US 12,470,963 B2
(45) Date of Patent: Nov. 11, 2025

(54) MEASUREMENT METHOD AND TERMINAL

(71) Applicant: VIVO MOBILE COMMUNICATION CO., LTD., Dongguan (CN)

(72) Inventors: Xiaodong Shen, Dongguan (CN); Xueming Pan, Dongguan (CN); Kai Wu, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 643 days.

(21) Appl. No.: 17/832,525

(22) Filed: Jun. 3, 2022

(65) Prior Publication Data
US 2022/0303814 A1 Sep. 22, 2022

Related U.S. Application Data

(63) Continuation of application No. PCT/CN2020/133779, filed on Dec. 4, 2020.

(30) Foreign Application Priority Data

Dec. 11, 2019 (CN) .......................... 201911269120.0

(51) Int. Cl.
*G08C 17/00* (2006.01)
*H04W 24/10* (2009.01)
*H04W 52/02* (2009.01)
*H04W 76/28* (2018.01)

(52) U.S. Cl.
CPC ....... *H04W 24/10* (2013.01); *H04W 52/0248* (2013.01); *H04W 76/28* (2018.02)

(58) Field of Classification Search
CPC . H04W 52/02; H04W 52/0203; H04W 24/10; H04W 52/0225; H04W 76/28; H04L 43/16
See application file for complete search history.

(56) References Cited

U.S. PATENT DOCUMENTS

| 8,548,456 B1* | 10/2013 | Ben-Eli | H04W 24/08 455/452.2 |
| 2008/0167089 A1* | 7/2008 | Suzuki | H04W 76/28 370/347 |

(Continued)

FOREIGN PATENT DOCUMENTS

| CN | 101617552 A | 12/2009 |
| CN | 101686551 A | 3/2010 |

(Continued)

OTHER PUBLICATIONS

First Office Action issued in related Chinese Application No. 201911269120.0, mailed Nov. 22, 2022, 7 pages.

(Continued)

*Primary Examiner* — Shantell L Heiber
(74) *Attorney, Agent, or Firm* — IPX PLLC

(57) ABSTRACT

Measurement methods and a terminal are provided. An exemplary measurement method includes determining an indication period of measurement according to a Discontinuous Reception (DRX) cycle. The measurement method further includes determining the indication period according to a length relationship between the DRX cycle and a threshold of the DRX cycle, wherein different length relationships correspond to different indication periods. The measurement method also includes using N times of the DRX cycle as the indication period. N is configured by a network side and N is a number greater than zero. The measurement method additionally includes determining the indication period as a fixed value if the DRX cycle is less than or equal to a specified value, wherein the fixed value is predefined or configured by the network side. The measurement method also includes determining an evaluation period according to the indication period.

20 Claims, 3 Drawing Sheets

(56) References Cited

U.S. PATENT DOCUMENTS

| | | | | |
|---|---|---|---|---|
| 2014/0065974 | A1* | 3/2014 | Sane | H04W 52/0254 |
| | | | | 455/67.11 |
| 2014/0185465 | A1* | 7/2014 | Balachandran | H04W 8/24 |
| | | | | 370/332 |
| 2016/0286419 | A1 | 9/2016 | Liu et al. | |
| 2021/0392525 | A1* | 12/2021 | Kaikkonen | H04B 7/0695 |

FOREIGN PATENT DOCUMENTS

| | | |
|---|---|---|
| CN | 101998474 A | 3/2011 |
| CN | 102612119 A | 7/2012 |
| CN | 103167551 A | 6/2013 |
| CN | 104902569 A | 9/2015 |
| CN | 110475276 A | 11/2019 |
| EP | 2665329 A1 | 11/2013 |
| GB | 2500260 A | 9/2013 |
| WO | 2019216418 A1 | 11/2019 |

OTHER PUBLICATIONS

Partial Supplementary European Search Report issued in related European Application No. 20900520.6, mailed Dec. 23, 2022, 19 pages.

Intel Corporation, "Discussion about RLM requirements for NR" 3GPP TSG-RAN4 Meeting #86bis, R4-1804192, Apr. 2018, 4 pages.

Intel Corporation, "Discussion about indication interval for NR RLM", 3GPP TSG-RAN WG4 Meeting #AH07, R4-1808721, Jul. 2018, 4 pages.

Examination Report issued in related Indian Application No. 202217039463, mailed Dec. 20, 2022, 6 pages.

Extended European Search Report issued in related European Application No. 20900520.6, mailed May 8, 2023, 21 pages.

Second Office Action issued in related Chinese Application No. 201911269120.0, mailed May 13, 2023, 12 pages.

VIVO, "RRM measurement relaxation criteria", 3GPP TSG-RAN WG2 Meeting #107bis, R2-1912334, Oct. 2019, 5 pages.

Decision of Reexamination issued in related Chinese Application No. 201911269120.0, mailed Feb. 29, 2024, 1 pages.

Third Office Action issued in related Chinese Application No. 201911269120.0, mailed Mar. 16, 2024, 9 pages.

Fourth Office Action issued in related Chinese Application No. 201911269120.0, mailed Jul. 6, 2024, 9 pages.

Hearing Notice issued in related Indian Application No. 202217039463, mailed Jun. 25, 2024, 2 pages.

International Search Report issued in corresponding International Application No. PCT/CN2020/133779, mailed Mar. 2, 2021, 6 pages.

* cited by examiner

Determine an indication period of measurement according to a DRX cycle — 21

Determine an indication period of measurement according to one of a movement condition and a position condition of a terminal — 31

MEASUREMENT METHOD AND TERMINAL

CROSS-REFERENCE TO RELATED APPLICATIONS

This application is a continuation of International Application No. PCT/CN2020/133779, filed Dec. 4, 2020, which claims priority to Chinese Patent Application No. 201911269120.0, filed in China on Dec. 11, 2019. The entire contents of each of the above-referenced applications are expressly incorporated herein by reference.

TECHNICAL FIELD

Embodiments of the present disclosure relate to the field of wireless communications technologies, and in particular to a measurement method and a terminal.

BACKGROUND

A terminal needs to perform some necessary measurement, such as Radio Link Monitoring (RLM) measurement, beam failure detection, Radio Resource Management (RRM) measurement, candidate beam measurement, in order to perform communications normally. If the terminal performs measurement frequently, great power consumption will be generated, which will seriously affect battery life and total life of the terminal. Therefore, a problem of how to determine some indication periods of measurement for the terminal, so that power consumption of the terminal can be saved, is to be solved urgently.

SUMMARY

Embodiments of the present disclosure provide a measurement method and a terminal to determine some indication periods of measurement, so that power consumption of the terminal can be saved.

To resolve the foregoing technical problem, the present disclosure is implemented as follows:

According to a first aspect, an embodiment of the present disclosure provides a measurement method, applied to a terminal and including: determining an indication period of measurement according to a Discontinuous Reception (DRX) cycle.

According to a second aspect, an embodiment of the present disclosure provides a measurement method, applied to a terminal and including: determining an indication period of measurement according to one of a movement condition and a position condition of the terminal.

According to a third aspect, an embodiment of the present disclosure provides a terminal, including:
 a first determining module, configured to determine an indication period of measurement according to a DRX cycle.

According to a fourth aspect, an embodiment of the present disclosure provides a terminal, including
 a determining module, configured to determine an indication period of measurement according to one of a movement condition and a position condition of the terminal.

According to a fifth aspect, an embodiment of the present disclosure provides a terminal, including a processor, a memory, and a computer program that is stored in the memory and that can be run on the processor, where when the computer program is executed by the processor, the steps of the measurement method according to the first aspect are implemented; or when the computer program is executed by the processor, the steps of the measurement method according to the second aspect are implemented.

According to a sixth aspect, an embodiment of the present disclosure provides a computer-readable storage medium, where the computer-readable storage medium stores a computer program, where when the computer program is executed by a processor, the steps of the measurement method according to the first aspect are implemented; or when the computer program is executed by a processor, the steps of the measurement method according to the second aspect are implemented.

In the embodiments of the present disclosure, different indication periods can be determined under different conditions, so that power consumption of the terminal can be saved.

BRIEF DESCRIPTION OF DRAWINGS

With reference to detailed descriptions in implementations in the following descriptions, various other advantages and benefits become clear to a person of ordinary skills in the art. The accompanying drawings are merely used to show the exemplary implementations, and are not considered as limitations to the present disclosure. In addition, in all the accompanying drawings, a same reference symbol is used to represent a same part. In the accompanying drawings.

DESCRIPTION OF EMBODIMENTS

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and the claims means at least one of the connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

Embodiments of the present disclosure will be described below with reference to the accompanying drawings. A measurement method and a terminal according to the embodiments of the present disclosure can be applied to a wireless communications system. The wireless communications system may be a 5G system, an evolved Long Term Evolution, eLTE) system, or a subsequent evolved communications system.

Figures 1, 2, 3:
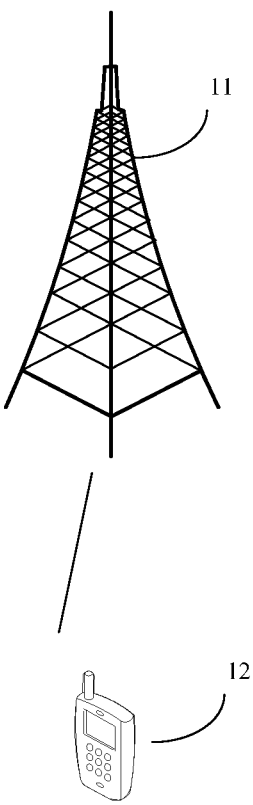
FIG. 1 is a schematic architectural diagram of a wireless communications system according to an embodiment of the present disclosure.
FIG. 2 is a schematic flow chart of a measurement method according to an embodiment of the present disclosure.
FIG. 3 is a schematic flow chart of a measurement method according to another embodiment of the present disclosure.

Referring to FIG. 1, it is a schematic architectural diagram of a wireless communications system according to an embodiment of the present disclosure. As shown in FIG. 1, the wireless communications system may include: a network side device 11 and a terminal 12. The terminal 12 may be connected to the network side device 11. In actual application, a connection between the foregoing devices may be a wireless connection. To conveniently and intuitively represent a connection relationship between the devices, a solid line is used for illustration in FIG. 1.

It should be noted that the communications system may include a plurality of terminals 12, and the network side device 11 may communicate (transmit signaling or data) with the plurality of terminals 12.

The network side device 11 provided in this embodiment of the present disclosure may be a base station. The base station may be a commonly used base station, or may be an evolved node base station (evolved nodeB, eNB), or may be further a device such as a network side device (for example, a next generation nodeB (gNB) or a Transmission and Reception Point (TRP)) in a 5G system, or a cell, or may be a network side device in a subsequent evolved communications system. The terms used constitute no limitation.

The terminal 12 provided in this embodiment of the present disclosure may be a mobile phone, a tablet computer, a notebook computer, an Ultra-Mobile Personal Computer (UMPC), a netbook, a Personal Digital Assistant (PDA), or the like. A person skilled in the art may understand that the terms used constitute no limitation.

Referring to FIG. 2, FIG. 2 is a schematic flow diagram of a measurement method according to an embodiment of the present disclosure. The measurement method is applied to a terminal and includes:

Step 21: Determine an indication period of measurement according to a DRX cycle.

The indication period in the present disclosure refers to a period in which the terminal indicates a measurement result to an upper layer of the terminal after completing the measurement. Generally, a measurement period of the terminal is the indication period.

In this embodiment of the present disclosure, because the DRX is set to save power consumption of the terminal, the indication period determined according to the DRX cycle can also help to save the power consumption of the terminal.

In some embodiments of the present disclosure, the step of determining an indication period of measurement according to a DRX cycle includes: determining the indication period according to a length relationship between the DRX cycle and a threshold of the DRX cycle, where different length relationships correspond to different indication periods.

For example, the threshold of the DRX cycle is 320 ms. The DRX period is compared with the threshold of the DRX cycle. When the DRX cycle is greater than 320 ms, indication period 1 is used as the indication period. When the DRX cycle is less than or equal to 320 ms, indication period 2 is used as the indication period.

That is to say, according to a length of the DRX cycle, the indication period of measurement is determined. When the DRX cycle is in different cycle ranges (for example, greater than 320 ms), the indication period is also different. For example, when the DRX cycle is long, a short indication period may be set, and when the DRX cycle is short, a long indication period may be set, so that power consumption of the terminal can be saved.

In some embodiments of the present disclosure, the threshold of the DRX cycle includes at least two thresholds, and the at least two thresholds of the DRX cycle may define at least three cycle ranges. For example, the threshold of the DRX cycle includes threshold 1 (such as 320 ms) and threshold 2 (such as 40 ms), and therefore, three cycle ranges can be defined, for example:

when the DRX cycle is greater than threshold 1 (such as 320 ms), indication period 1 is used as the indication period;

when the DRX cycle is greater than threshold 2 (such as 40 ms but is not greater than threshold 1 (such as 320 ms), indication period 2 is used as the indication period; and when the DRX cycle is not greater than threshold 2 (such as 40 ms), indication period 3 is used as the indication period.

It can be seen that when there are more DRX thresholds, more cycle ranges may be defined, so that values of the indication period are more different, so as to be adapted to more scenes. For example, when the DRX cycle is relatively short, the indication period may be prolonged, so that the power consumption of the terminal can be saved.

In this embodiment of the present disclosure, the threshold of the DRX cycle may be predefined, that is, stipulated by a protocol. The threshold may also be configured by the network side. In this way, the threshold may be dynamically configured as required, so that flexibility can be improved.

In the foregoing embodiment, the indication period corresponding to at least one of the length relationships is a multiple of the DRX cycle. For example, when the DRX cycle is greater than 320 ms, 1 times of the DRX cycle is used as the indication period. That is to say, a length of the indication period is related to a length of the DRX cycle. Because the DRX is set to save the power consumption of the terminal, the indication period of the measurement is determined according to the DRX cycle, which can also save the power consumption of the terminal.

In this embodiment of the present disclosure, the multiple may be predefined. The multiple may also be configured by the network side. In this way, the multiple may be dynamically configured as required, so that flexibility can be improved.

In some embodiments of the present disclosure, the determining an indication period of measurement according to a DRX cycle includes: using N times of the DRX cycle as the indication period, where N is configured by the network side and N is a number greater than zero. In this embodiment of the present disclosure, the length of the indication period is a multiple of the length of the DRX cycle. Because the DRX is set to save the power consumption of the terminal, the indication period of measurement is determined according to the DRX cycle, which can also save the power consumption of the terminal. In addition, the multiple is configured by the network side. In this way, the multiple may be dynamically configured as required, so that flexibility can be improved.

In some embodiments of the present disclosure, the determining an indication period of measurement according to a DRX cycle includes: determining the indication period as a fixed value if the DRX cycle is less than or equal to a specified value. For example, when the DRX cycle is less than 40 ms, a fixed value of 40 ms is used as the indication period. The fixed value is unrelated to the DRX cycle. In some embodiments, the fixed value is predefined or configured by the network side.

In some embodiments of the present disclosure, the measurement method further includes: determining an evaluation period according to the indication period. The indication period is N times of the DRX cycle, and the evaluation period is N times of a predefined or configured original evaluation period. One evaluation period corresponds to at least two indication periods. Within the evaluation period, it is determined whether to report a measurement result to the network side according to the measurement result within a plurality of consecutive indication periods.

In some embodiments of the present disclosure, the measurement method further includes:

determining the indication period as a first fixed value if a timer is started; or determining the indication period as a second fixed value if a timer is not started.

In some embodiments, if the measurement is radio link monitoring measurement, the timer may be a T310 timer. The timer is started when the number of continuously received downlink out-of-sync indications is greater than a specified threshold or out-of-sync indications are received continuously within a certain period of time.

In some embodiments, the first fixed value is predefined or configured by the network side; and the second fixed value is predefined or configured by the network side.

In some embodiments, the first fixed value is smaller than the second fixed value, and the first fixed value may be predefined or configured by the network side.

When the timer is started, the indication period may be shortened, so that monitoring of a channel can be enhanced, and when the timer is not started, the indication period may be prolonged, so that power consumption can be saved.

Next, a trigger condition for determining the indication period of measurement according to this embodiment of the present disclosure will be described.

In some embodiments of the present disclosure, if the terminal meets a movement condition, the indication period of measurement is determined according to the DRX cycle.

In some embodiments, if a variation of a signal quality parameter of the terminal within a specified time is greater than a specified threshold, it is determined that the terminal meets the movement condition.

In some embodiments, the signal quality parameter includes Reference Signal Received Power (RSRP) or Reference Signal Received Quality (RSRQ).

For example, when the terminal is in a mobile state or changes from a relatively static state to the mobile state, the RSRP or RSRQ may change. If a variation (for example, an average variation within a specified time) is greater than a specified threshold within a period of time, it can be determined that the terminal meets the movement condition. If the variation of the signal quality parameter of the terminal is not greater than a specified threshold within a specified time, when the terminal is in a static state or changes from a mobile state to the static state, the indication period of measurement is determined as N times of the DRX cycle.

The terminal may choose different indication periods under different conditions. For example, when the terminal is in the relatively static state, the indication period may be prolonged properly, so that the power consumption of the terminal can be saved.

In some embodiments of the present disclosure, the determining an indication period of measurement according to a DRX cycle includes: determining the indication period of measurement according to the DRX cycle if the terminal meets a position condition.

In some embodiments, if the signal quality parameter of the terminal is greater than a specified threshold, it is determined that the terminal meets the position condition.

In some embodiments, the signal quality parameter includes the RSRP or RSRQ.

For example, the terminal may choose different indication periods under different position conditions. For example, when signal quality of the terminal is relatively good, the indication period may be prolonged properly, so that the power consumption of the terminal can be saved.

In this embodiment of the present disclosure, the measurement is at least one of the following:

RLM measurement;
beam failure measurement;
RRM measurement; or
candidate beam measurement.

When the measurement is the RLM measurement, a resource of the RLM, (such as a synchronization signal block (Synchronization Signal and PBCH Block, SSB), a Channel State Information-Reference Signal (CSI-RS), and other reference signals) configured in a Downlink (DL) is measured, so that it is determined whether there is a failure in a downlink radio link, and an in-sync event and out-of-sync event are generated according to a measurement result, and the events are reported to a higher layer.

In this embodiment of the present disclosure, when the terminal is in the relatively static state, the RLM measurement may be performed relatively flexibly, that is, the indication period can be prolonged, so that the power consumption of the terminal can be saved.

Referring to FIG. 3, an embodiment of the present disclosure further provides a measurement method. The method is applied to a terminal and includes:

Step 31: Determine an indication period of measurement according to one of a movement condition and a position condition of the terminal.

In this embodiment of the present disclosure, the terminal may choose different indication periods under different conditions. For example, when the terminal is in a relatively static state, the indication period may be prolonged properly, so that power consumption of the terminal can be saved.

In this embodiment of the present disclosure, if a variation of a signal quality parameter of the terminal within a specified time is greater than a specified threshold, it is determined that the terminal meets the movement condition.

In some embodiments, the signal quality parameter includes RSRP or RSRQ.

In some embodiments, the determining an indication period of measurement according to a movement condition of the terminal includes:

determining the indication period as a first indication period if the variation of the signal quality parameter of the terminal within a specified time is greater than the specified threshold; or determining the indication period as a second indication period if the variation of the signal quality parameter of the terminal within a specified time is not greater than the specified threshold.

In some embodiments, at least one of the first indication period and the second indication period is a multiple of a DRX cycle.

In this embodiment of the present disclosure, if the signal quality parameter of the terminal is greater than a specified threshold, it is determined that the terminal meets the position condition.

In some embodiments, the signal quality parameter includes RSRP or RSRQ.

In some embodiments, the determining an indication period of measurement according to a position condition of the terminal includes:
- determining the indication period as a third indication period if the signal quality parameter of the terminal is greater than the specified threshold; or
- determining the indication period as a fourth indication period if the signal quality parameter of the terminal is not greater than the specified threshold.

In some embodiments, at least one of the third indication period and the fourth indication period is a multiple of the DRX cycle.

In some embodiments, the multiple is predefined or configured by a network side.

The measurement method of the present disclosure will be described below with reference to some specific embodiments.

Embodiment 1a

There are two configured or predefined thresholds of the DRX cycle: DRX Cycle1=320 ms, and DRX Cycle2=40 ms, where the DRX Cycle1 and DRX Cycle2 define three cycle ranges:
- when the DRX cycle is greater than DRX Cycle1 (320 ms), the indication period of RLM=1 DRX cycle (N=1);
- when the DRX cycle is greater than DRX Cycle2 (40 ms) but is not greater than DRX Cycle1 (320 ms), the indication period of RLM=1 DRX cycles (N=1.5); or
- when the DRX cycle is not greater than DRX Cycle2 (40 ms), the indication period of RLM=5 DRX cycles (N=5).

In this embodiment of the present disclosure, the indication period is N times of the DRX cycle.

It can be seen that in the foregoing embodiment, a multiple (N) corresponding to an indication period corresponding to the DRX cycle that is not greater than the specified threshold of the DRX cycle is greater than a multiple corresponding to an indication period corresponding to the DRX cycle that is greater than the specified threshold of the DRX cycle. That is to say, when the DRX cycle is relatively short, the indication period is prolonged, so that power consumption of the terminal can be saved.

In this embodiment of the present disclosure, a plurality of cycle ranges are defined, so that values of the indication period of RLM are more different to be adapted to more scenes. For example, when the DRX cycle is relatively short, the indication period is prolonged, so that the power consumption of the terminal can be saved.

Embodiment 1b

A threshold X (with a unit of millisecond, ms) of a DRX cycle is configured by a base station through RRC signaling.

When the DRX cycle is not greater than X, an indication period of RLM is indication period 1; or
when the DRX cycle is greater than X, the indication period of the PIM is indication period 2.

In this embodiment of the present disclosure, by dynamic configuration of the threshold of the DRX cycle by the base station, different numerical values can be configured under different conditions as required, so that flexibility can be improved. For example, when the terminal is in a relatively stationary condition, the indication period of the RLM can be prolonged, so that power consumption can be saved.

Embodiment 2

When a DRX cycle is less than or equal to a specified value, a fixed value is used as an indication period of RLM (unrelated to the DRX cycle), for example:
- when the DRX cycle is greater than DRX Cycle1 (320 ms), the indication period of the RLM=1 DRX cycle;
- when the DRX cycle is greater than DRX Cycle2 (40 ms) but is not greater than DRX Cycle1 (320 ms), the indication period of the RLM=1.5 DRX cycles; or
- when the DRX cycle is not greater than DRX Cycle2 (40 ms), the indication period of the RLM=40 ms (a fixed value, unrelated to the DRX cycle).

In this embodiment of the present disclosure, when the DRX cycle is less than or equal to a certain specified value, a fixed value is used as the indication period of the RLM regardless of a length of the DRX cycle, so that measurement of the RLM can be implemented easily.

Embodiment 3

N times of a DRX cycle is used as an indication period of RLM for a terminal, where N is configured by a network side and N is a number greater than zero.

In this embodiment of the present disclosure, it is configured by a network side that the terminal uses N times of the DRX cycle as the indication period of the RLM. For example, the indication period of the RLM is prolonged, so that power consumption of the terminal can be reduced.

Embodiment 4

An indication period of RLM is determined by a terminal according to a movement condition, where the movement condition includes:
- if a variation of a signal quality parameter (RSRP or RSRQ) of the terminal is greater than a specified threshold within a specified time, it is determined that the terminal meets the movement condition.

If the variation of the signal quality parameter (RSRP or RSRQ) of the terminal within a specified time is greater than the specified threshold, the indication period is determined as a first indication period.

If the variation of the signal quality parameter (RSRP or RSRQ) of the terminal within a specified time is not greater than the specified threshold, the indication period is determined as a second indication period.

In some embodiments, the second indication period is longer than the first indication period. That is, when the terminal is relatively stationary, the indication period of the RLM can be prolonged properly, so that power consumption of the terminal can be saved.

In this embodiment of the present disclosure, the first indication period and the second indication period may or may not be determined according to the DRX cycle, and are predefined or configured specified values.

In this embodiment of the present disclosure, under different movement conditions, the terminal may choose different indication periods of the RLM. For example, if a state of the terminal does not vary, the indication period of the RLM may be prolonged properly, so that the power consumption of the terminal can be saved.

Embodiment 5

An indication period of RLM is determined by a terminal according to a position condition, where the position condition includes:
if RSRP or RSRQ of the terminal is greater than a specified threshold, it is determined that the terminal meets the position condition.

If a signal quality parameter of the terminal is greater than a specified threshold, the indication period of the RLM is determined as a third indication period.

If the signal quality parameter of the terminal is not greater than the specified threshold, the indication period of the RLM is determined as a fourth indication period.

In some embodiments, the third indication period is longer than the fourth indication period. That is, when signal quality of the terminal is relative good, the indication period of the RLM may be prolonged properly, so that power consumption of the terminal can be saved.

In this embodiment of the present disclosure, the third indication period and the fourth indication period may or may not be determined according to the DRX cycle, and are predefined or configured specified values.

In this embodiment of the present disclosure, under different position conditions, the terminal may choose different indication periods of the RLM. For example, if the signal quality of the terminal is relatively good, the indication period of the RLM may be prolonged properly, so that the power consumption of the terminal can be saved.

Embodiment 6

In an embodiment that an indication period of RLM is determined by a terminal according to a DRX cycle, the DRX cycle and some related parameters of an indication period of the RLM may be configured by a network side or predefined.

For example:
(1) both X and N are predefined.
X is a threshold of the DRX cycle, the indication period is a multiple of the DRX cycle, and N is the multiple.
(2) X is configured by the network side, and N is predefined.
For example, a threshold X (with a unit of millisecond, ms) of the DRX cycle is configured for a base station, and when the DRX cycle is less than (or less than or equal to) the threshold X, the terminal uses N1 times of the DRX cycle as the indication period of the RLM; and when the DRX cycle is greater than (or greater than or equal to) the threshold X, the terminal uses N2 times of the DRX cycle as the indication period of the RLM. N includes N1 and N2.
(3) X is predefined, some of N is configured by the network side, and the rest of N is predefined.
For example, when the DRX cycle is less than (or less than or equal to) the threshold X, the terminal uses N1 times of the DRX cycle as the indication period of the RLM; and when the DRX cycle is greater than (or greater than or equal to) the threshold X, the terminal uses N2 times of the DRX cycle as the indication period of the RLM. N includes N1 and N2, N1 is configured by the network side, and N2 and X are predefined.
(4) X and N are configured by the network side.
For example, a threshold X (with a unit of millisecond, ms) of the DRX cycle is configured for a base station, and when the DRX cycle is less than (or less than or equal to) the threshold X, the terminal uses N1 times of the DRX cycle as the indication period of the RLM; and when the DRX cycle is greater than (or greater than or equal to) the threshold X, the terminal uses N2 times of the DRX cycle as the indication period of the RLM. N includes N1 and N2, and N1 and N2 are configured by the network side.

Embodiment 7

If a terminal starts a timer, the indication period is determined as a first fixed value; or if the terminal does not start a timer, the indication period is determined as a second fixed value.

The first fixed value is smaller than the second fixed value, and the first fixed value may be predefined or configured by a network side.

In this embodiment of the present disclosure, when the timer is started, the indication period may be shortened, so that monitoring can be enhanced, and when the timer is not started, the indication period may be prolonged, so that power consumption can be saved.

Figure 4:
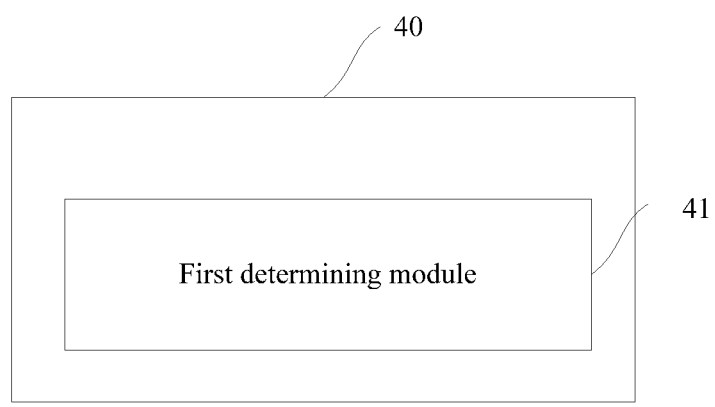
FIG. 4 is a schematic structural diagram of a terminal according to an embodiment of the present disclosure.

Referring to FIG. 4, the present disclosure further provides a terminal 40, including:
a first determining module 41, configured to determine an indication period of measurement according to a discontinuous reception DRX: cycle.

In some embodiments, the first determining module 41 is configured to determine the indication period according to a length relationship between the DRX cycle and a threshold of the DRX cycle, and different length relationships correspond to different indication periods.

In some embodiments, the threshold of the DRX cycle includes at least two thresholds.

In some embodiments, the threshold of the DRX cycle is predefined or configured by the network side.

In some embodiments, the indication period corresponding to at least one of the length relationships is a multiple of the DRX cycle.

In some embodiments, the multiple is predefined or configured by the network side.

In some embodiments, the first determining module 41 is configured to use N times of the DRX cycle as the indication period, where N is configured by the network side and N is a number greater than zero.

In some embodiments, the first determining module 41 is configured to determine the indication period as a fixed value if the DRX cycle is less than or equal to a specified value.

In some embodiments, the fixed value is predefined or configured by the network side.

In some embodiments, the terminal further includes:
a second determining module, configured to determine an evaluation period according to the indication period. The indication period is N times of the DRX cycle, and the evaluation period is N times of a predefined or configured original evaluation period.

In some embodiments, the terminal further includes:
a third determining module, configured to determine, if a timer is started, that the indication period is a first fixed value; or determine, if a timer is not started, that the indication period is a second fixed value.

In some embodiments, if the measurement is radio link monitoring measurement, the timer is started when the number of continuously received downlink out-of-sync indications is greater than a specified threshold.

In some embodiments, the first fixed value is predefined or configured by the network side; and the second fixed value is predefined or configured by the network side.

In some embodiments, the first determining module 41 is configured to determine the indication period of measurement according to the DRX cycle if the terminal meets a movement condition.

In some embodiments, if a variation of a signal quality parameter of the terminal within a specified time is greater than a specified threshold, it is determined that the terminal meets the movement condition.

In some embodiments, the first determining module 41 is configured to determine the indication period of measurement according to the DRX cycle if the terminal meets a position condition.

In some embodiments, if the signal quality parameter of the terminal is greater than a specified threshold, it is determined that the terminal meets the position condition.

In some embodiments, the measurement is at least one of the following:

radio link monitoring measurement;
beam failure measurement;
radio resource management measurement; or
candidate beam measurement.

The terminal provided in this embodiment of the present disclosure can implement the processes implemented by the terminal in the method embodiment in FIG. 2. To avoid repetition, details are not described herein again.

Figure 5:
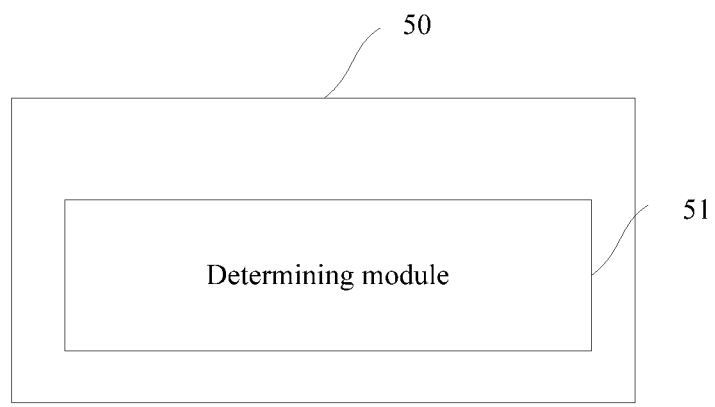
FIG. 5 is a schematic structural diagram of a terminal according to another embodiment of the present disclosure.

Referring to FIG. 5, an embodiment of the present disclosure further provides a terminal 50, including:

a determining module 51, configured to determine an indication period of measurement according to one of a movement condition and a position condition of the terminal.

In some embodiments, if a variation of a signal quality parameter of the terminal within a specified time is greater than a specified threshold, it is determined that the terminal meets the movement condition.

In some embodiments, the determining module 51 is configured to determine the indication period as a first indication period if the variation of the signal quality parameter of the terminal is greater than a specified threshold within a specified time; or determine the indication period as a second indication period if the variation of the signal quality parameter of the terminal within a specified time is not greater than the specified threshold.

In some embodiments, at least one of the first indication period and the second indication period is a multiple of a DRX cycle.

In some embodiments, if the signal quality parameter of the terminal is greater than a specified threshold, it is determined that the terminal meets the position condition.

In some embodiments, the determining module 51 is configured to determine the indication period as a third indication period if the signal quality parameter of the terminal is greater than a specified threshold; or determine the indication period as a fourth indication period if the signal quality parameter of the terminal is not greater than the specified threshold.

In some embodiments, at least one of the third indication period and the fourth indication period is a multiple of the DRX cycle.

In some embodiments, the multiple is predefined or configured by the network side.

The terminal provided in this embodiment of the present disclosure can implement the processes implemented by the terminal in the method embodiment in FIG. 3. To avoid repetition, details are not described herein again.

Figure 6:
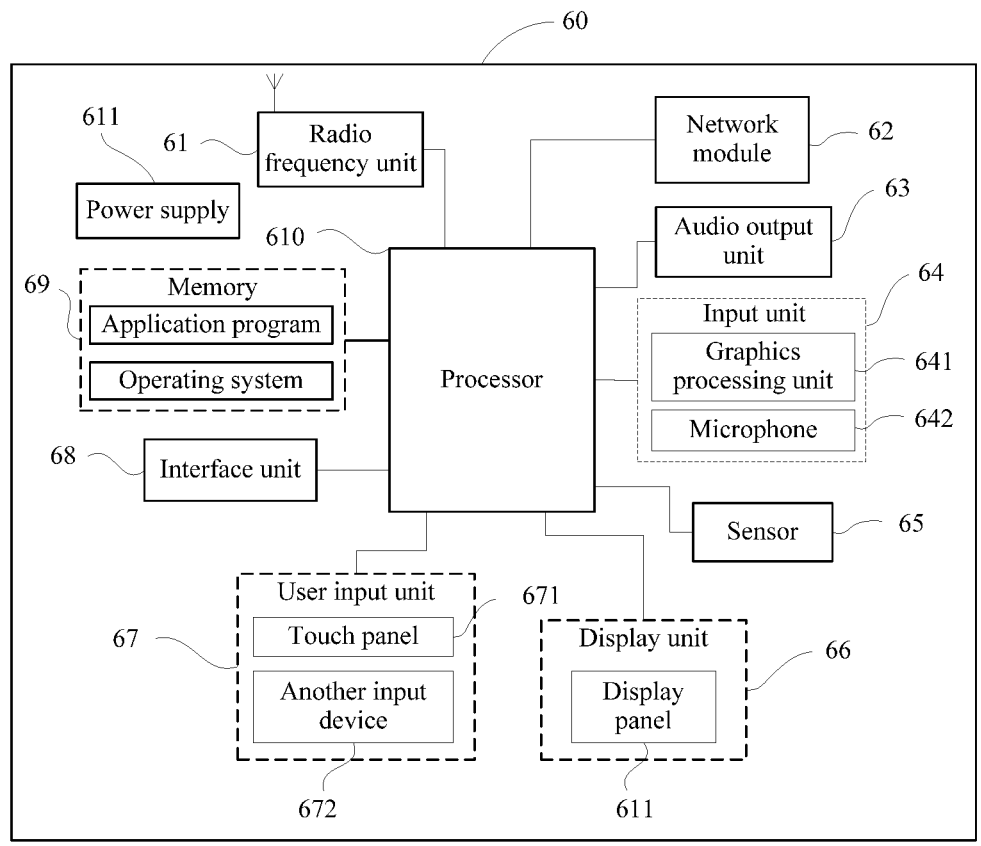
FIG. 6 is a schematic structural diagram of a terminal according to still another embodiment of the present disclosure.
Figure 7:
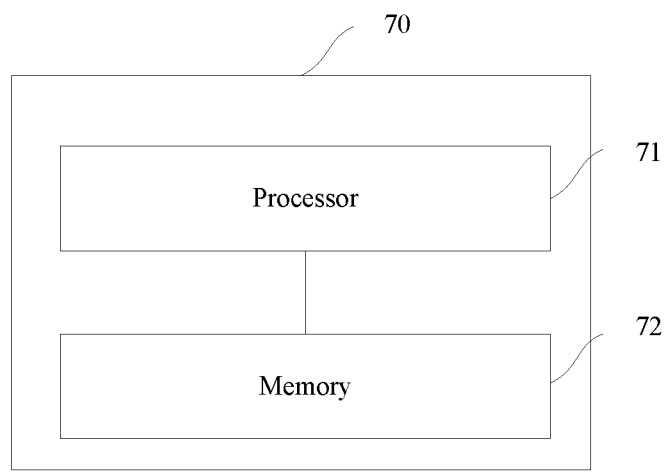
FIG. 7 is a schematic structural diagram of a terminal according to a yet another embodiment of the present disclosure.

FIG. 6 is a schematic structural diagram of hardware of a terminal for implementing embodiments of the present disclosure.

The terminal 60 includes but is not limited to: a radio frequency unit 61, a network module 62, an audio output unit 63, an input unit 64, a sensor 65, a display unit 66, a user input unit 67, an interface unit 68, a memory 69, a processor 610, a power supply 611, and the like. Those skilled in the art may understand that the terminal structure shown in FIG. 1 does not constitute a limitation to the terminal. The terminal may include more or fewer components than those shown in the figure, or some components may be combined, or there may be a different component arrangement. In this embodiment of the present disclosure, the terminal includes but is not limited, to a mobile phone, a tablet computer, a laptop computer, a palmtop computer, an in-vehicle terminal, a wearable device, a pedometer, and the like.

The processor 610 is configured to determine an indication period of measurement according to a DRX cycle.

Alternatively, the processor 610 is configured to determine the indication period of measurement according to one of a movement condition and a position condition of the terminal.

In this embodiment of the present disclosure, different indication periods can be determined under different conditions, so that power consumption of the terminal can be saved.

It should be understood that, in this embodiment of the present disclosure, the radio frequency unit 61 may be configured to receive and send information or receive and send a signal in a call process. Specifically, after downlink data from a base station is received, the processor 610 processes the downlink data. In addition, uplink data is sent to the base station. Generally, the radio frequency unit 61 includes, but is not limited to, an antenna, at least one amplifier, a transceiver, a coupler, a low noise amplifier, a duplexer, and the like. In addition, the radio frequency unit 61 may further communicate with another device through a radio communication system and network.

The terminal provides wireless broadband Internet access to a user through the network module 62, for example, helps the user receive and send e-mails, browse web pages, access streaming media, and the like.

The audio output unit 63 may convert audio data received by the radio frequency unit 61 or the network module 62 or stored in the memory 69 into an audio signal and output the audio signal as a sound. In addition, the audio output unit 63 may further provide an audio output (for example, a call signal received voice, or a message received voice) related to a specific function implemented by the terminal 60. The audio output unit 63 includes a speaker, a buzzer, a telephone receiver, and the like.

The input unit 64 is configured to receive an audio or video signal. The input unit 64 may include a Graphics Processing Unit (GPU) 641 and a microphone 642. The graphics processing unit 641 processes image data of a static picture or a video obtained by an image capture apparatus (for example, a camera) in video capture mode or image capture mode. A processed image frame may be displayed on the display unit 66. The image frame processed by the graphics processing unit 641 may be stored in the memory 69 (or another storage medium) or sent by using the radio frequency unit 61 or the network module 62. The microphone 642 may receive a sound and can process such sound into audio data. The processed audio data may be converted, in a phone calling mode, into a format that may be transmitted to a mobile communication base station by using the radio frequency unit 61 for output.

The terminal 60 further includes at least one sensor 65, for example, a light sensor, a motion sensor, and another sensor. Specifically, the light sensor includes an ambient light sensor and a proximity sensor. The ambient light sensor may adjust luminance of the display panel 661 based on brightness of ambient light. The proximity sensor may turn off the display panel 661 and/or backlight when the terminal 60 is moved to an ear. As a motion sensor, an accelerometer sensor can detect magnitude of acceleration in various directions (usually three axes), can detect magnitude and the direction of gravity when stationary, can be configured to implement functions related to a terminal posture (such as switching between a landscape mode and a portrait mode, related games, and magnetometer posture calibration) identification and vibration identification (such as a pedometer and a knock), and the like. The sensor 65 may further include a fingerprint sensor, a pressure sensor, an iris sensor, a molecular sensor, a gyroscope, a barometer, a hygrometer, a thermometer, an infrared sensor, or the like. Details are not described herein.

The display unit 66 is configured to display information entered by the user or information provided for the user. The display unit 66 may include a display panel 661, and the display panel 661 may be configured in a form of a Liquid Crystal Display (LCD), an Organic Light-Emitting Diode (OLED), or the like.

The user input unit 67 may be configured to receive input digit or character information and generate key signal input related to user setting and function control of the terminal. Specifically, the user input unit 67 includes a touch panel 671 and another input device 672. The touch panel 671, also known as a touchscreen, can collect a user's touch operation on or near the touch panel 671 (such as an operation on or near the touch panel 671 made by the user via a finger, a stylus, or any suitable object or accessory). The touch panel 671 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 610, and receives and executes a command sent by the processor 610. In addition, the touch panel 671 may be implemented in a plurality of forms, such as a resistive type, a capacitive type, an infrared ray type, or a surface acoustic wave type. In addition to the touch panel 671, the user input unit 67 may further include another input device 672. Specifically, the another input device 672 may include but is not limited to a physical keyboard, a function key (such as a volume control key or an on/off key), a trackball, a mouse, or a joystick. Details are not described herein.

Further, the touch panel 671 may cover the display panel 661. When detecting the touch operation on or near the touch panel 671, the touch panel 671 transmits the touch operation to the processor 610 to determine a type of a touch event, and then the processor 610 provides corresponding visual output on the display panel 661 based on the type of the touch event. Although in FIG. 6, the touch panel 671 and the display panel 661 are used as two independent components to implement input and output functions of the terminal, in some embodiments, the touch panel 671 and the display panel 661 may be integrated to implement the input and output functions of the terminal. This is not specifically limited herein.

The interface unit 68 is an interface connecting an external apparatus to the terminal 60. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 68 may be configured to receive input (for example, data information and power) from the external apparatus and transmit the received input to one or more elements in the terminal 60, or may be configured to transmit data between the terminal 60 and the external apparatus.

The memory 69 may be configured to store a software program and various kinds of data. The memory 69 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 69 may include a high-speed random access memory or a nonvolatile memory, for example, at least one disk storage device, a flash memory, or other volatile solid-state storage devices.

The processor 610 is a control center of the terminal, and connects all parts of the entire terminal by using various interfaces and lines. By running or executing a software program and/or a module stored in the memory 69 and invoking data stored in the memory 69, the processor performs various functions of the terminal and data processing, to perform overall monitoring on the terminal. The processor 610 may include one or more processing units. For example, an application processor and a modem processor may be integrated into the processor 610. The application processor mainly processes an operating system, a user interface, an application program, and the like. The modem processor mainly processes wireless communications. It may be understood that the foregoing modem processor may not be integrated in the processor 610.

The terminal 60 may further include the power supply 611 (such as a battery) that supplies power to each component. For example, the power supply 611 may be logically connected to the processor 610 by using a power management system, so as to implement functions such as charging, discharging, and power consumption management by using the power management system.

In addition, the terminal 60 includes some functional modules that are not shown. Details are not described herein.

For example, an embodiment of the present disclosure further provides a terminal 70, including a processor 71, a memory 72, and a computer program that is stored in the memory 72 and that can be run on the processor 71. When the processor 71 executes the computer program, the processes of the method embodiment in FIG. 2 or FIG. 3 are implemented, and a same technical effect can be achieved. To avoid repetition, details are not described herein again.

An embodiment of the present disclosure further provides a computer-readable storage medium. The computer-readable storage medium stores a computer program, and when a processor executes the computer program, the processes in the method embodiment shown in FIG. 2 or FIG. 3 are implemented, and a same technical effect can be achieved.

To avoid repetition, details are not described herein. The computer readable storage medium is a Read-Only Memory (ROM), a Random Access Memory (RAM), a magnetic disk, an optical disc, or the like.

It should be noted that in this specification, the terms "comprise", "include" and any other variants thereof are intended to cover non-exclusive inclusion, so that a process, a method, an article, or an apparatus that includes a series of elements not only includes those elements, but may also include other elements not expressly listed, or also include elements inherent to this process, method, article, or apparatus. An element limited by "includes a . . . " does not preclude, without more constraints, the presence of an additional identical element in the process, method, article, or apparatus that includes the element.

According to the foregoing descriptions of the implementations, a person skilled in the art may clearly understand that the method in the foregoing embodiments may be implemented by using software and a required universal hardware platform, or certainly may be implemented by using hardware. However, in many cases, the former is a better implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. A measurement method, performed by a terminal, comprising:
determining an indication period of measurement as N times of a Discontinuous Reception (DRX) cycle according to a relationship between the DRX cycle and a threshold of the DRX cycle when a variation of a signal quality parameter of the terminal is not greater than a specified threshold within a specified time, wherein N is an integer greater than zero;
determining an evaluation period according to the indication period; and
determining whether to report a measurement result to a network side, according to the measurement result within a plurality of consecutive indication periods within the evaluation period.

2. The measurement method according to claim 1, wherein the threshold of the DRX cycle comprises at least two thresholds, and the threshold of the DRX cycle is predefined or configured by the network side.

3. The measurement method according to claim 1, wherein N is predefined or configured by the network side.

4. The measurement method according to claim 1, further comprising:
determining the indication period as a first fixed value when a timer is started, wherein the first fixed value is predefined or configured by the network side; or
determining the indication period as a second fixed value when a timer is not started, wherein the second fixed value is predefined or configured by the network side.

5. The measurement method according to claim 4, wherein when the measurement is radio link monitoring measurement, the timer is started when a number of continuously received downlink out-of-sync indications is greater than the specified threshold or out-of-sync indications are received continuously within a certain period of time.

6. The measurement method according to claim 1, further comprising determining the indication period of measurement according to the DRX cycle when the terminal meets a position condition.

7. The measurement method according to claim 6, wherein
when the signal quality parameter of the terminal is greater than the specified threshold, it is determined that the terminal meets the position condition.

8. The measurement method according to claim 1, wherein the measurement is at least one of the following:
radio link monitoring measurement;
beam failure measurement;
radio resource management measurement; or
candidate beam measurement.

9. A terminal, comprising a processor, a memory, and a computer program that is stored in the memory and that is configured to be run on the processor, wherein the computer program, when executed by the processor, causes the processor to implement operations comprising:
determining an indication period of measurement as N times of a Discontinuous Reception (DRX) cycle according to a relationship between the DRX cycle and a threshold of the DRX cycle when a variation of a signal quality parameter of the terminal is not greater than a specified threshold within a specified time, wherein N is an integer greater than zero;
determining an evaluation period according to the indication period; and
determining whether to report a measurement result to a network side, according to the measurement result within a plurality of consecutive indication periods within the evaluation period.

10. The terminal according to claim 9, wherein the threshold of the DRX cycle comprises at least two thresholds, and the threshold of the DRX cycle is predefined or configured by the network side.

11. The terminal according to claim 9, wherein N is predefined or configured by the network side.

12. The terminal according to claim 9, wherein the operations further comprise:
determining the indication period as a first fixed value when a timer is started, wherein the first fixed value is predefined or configured by the network side; or
determining the indication period as a second fixed value when a timer is not started, wherein the second fixed value is predefined or configured by the network side.

13. The terminal according to claim 12, wherein when the measurement is radio link monitoring measurement, the timer is started when a number of continuously received downlink out-of-sync indications is greater than the specified threshold or out-of-sync indications are received continuously within a certain period of time.

14. The terminal according to claim 9, wherein the computer program, when executed by the processor, causes the processor to implement operations further comprising:
  determining the indication period of measurement according to the DRX cycle when the terminal meets a position condition.

15. The terminal according to claim 14, wherein
  when the signal quality parameter of the terminal is greater than the specified threshold, it is determined that the terminal meets the position condition.

16. The terminal according to claim 9, wherein the measurement is at least one of the following:
  radio link monitoring measurement;
  beam failure measurement;
  radio resource management measurement; or
  candidate beam measurement.

17. A non-transitory computer-readable storage medium storing instructions that, when executed by a processor, cause the processor to perform operations comprising:
  determining an indication period of measurement as N times of a Discontinuous Reception (DRX) cycle according to a relationship between the DRX cycle and a threshold of the DRX cycle when a variation of a signal quality parameter of a terminal is not greater than a specified threshold within a specified time, wherein N is an integer greater than zero;
  determining an evaluation period according to the indication period; and
  determining whether to report a measurement result to a network side, according to the measurement result within a plurality of consecutive indication periods within the evaluation period.

18. The computer-readable storage medium according to claim 17, wherein the threshold of the DRX cycle comprises at least two thresholds, and the threshold of the DRX cycle is predefined or configured by the network side.

19. The computer-readable storage medium according to claim 17, wherein N is predefined or configured by the network side.

20. The computer-readable storage medium according to claim 17, wherein the operations further comprise:
  determining the indication period as a first fixed value when a timer is started, wherein the first fixed value is predefined or configured by the network side; or
  determining the indication period as a second fixed value when a timer is not started, wherein the second fixed value is predefined or configured by the network side.

* * * * *